US007757649B2

(12) United States Patent
Wakahara

(10) Patent No.: US 7,757,649 B2
(45) Date of Patent: Jul. 20, 2010

(54) CONTROLLER, COOLING SYSTEM ABNORMALITY DIAGNOSIS DEVICE AND BLOCK HEATER DETERMINATION DEVICE OF INTERNAL COMBUSTION ENGINE

(75) Inventor: Keiji Wakahara, Inazawa (JP)

(73) Assignee: DENSO CORPORATION, Kariya (JP)

( * ) Notice: Subject to any disclaimer, the term of this patent is extended or adjusted under 35 U.S.C. 154(b) by 174 days.

(21) Appl. No.: 12/122,256

(22) Filed: May 16, 2008

(65) Prior Publication Data

US 2008/0300774 A1 Dec. 4, 2008

(30) Foreign Application Priority Data

Jun. 4, 2007 (JP) ............................ 2007-148634
Jun. 4, 2007 (JP) ............................ 2007-148635

(51) Int. Cl.
*B60H 1/03* (2006.01)
*B60H 1/00* (2006.01)

(52) U.S. Cl. ......................... 123/142.5 E; 123/142.5 R

(58) Field of Classification Search ........... 123/142.5 E, 123/142.5 R, 41.01, 41.15; 701/114, 113, 701/101, 102, 29, 35; 73/114.68; 219/494, 219/497

See application file for complete search history.

(56) References Cited

U.S. PATENT DOCUMENTS

| | | | | |
|---|---|---|---|---|
| 3,744,046 | A * | 7/1973 | Tamasi | 340/640 |
| 5,419,287 | A * | 5/1995 | Evans | 123/41.29 |
| 5,781,877 | A * | 7/1998 | Rachel et al. | 701/104 |
| 6,240,774 | B1 | 6/2001 | Niki et al. | |
| 6,714,854 | B2 | 3/2004 | Linenberg et al. | |
| 7,022,943 | B1 * | 4/2006 | Barta | 219/205 |
| 7,168,399 | B2 * | 1/2007 | Wakahara | 123/41.15 |
| 7,277,791 | B2 * | 10/2007 | Petrosius et al. | 701/112 |

FOREIGN PATENT DOCUMENTS

JP 2002-30959 1/2002

* cited by examiner

*Primary Examiner*—Mahmoud Gimie
(74) *Attorney, Agent, or Firm*—Nixon & Vanderhye PC

(57) ABSTRACT

A plug of a power cord of a block heater, which is mounted to a cylinder block of an engine, is connected to a household power receptacle to energize the block heater during an engine stoppage in cold climate. Thus, an engine coolant is kept warm to prevent freeze. Existence/nonexistence of the energization to the block heater during the engine stoppage is determined based on a behavior of coolant temperature or a behavior of engine rotation speed immediately after an engine start. If it is determined that the energization to the block heater exists, abnormality diagnosis of a cooling system is prohibited or a condition for the abnormality diagnosis is corrected and estimation coolant temperature is corrected.

10 Claims, 10 Drawing Sheets

CONTROLLER, COOLING SYSTEM ABNORMALITY DIAGNOSIS DEVICE AND BLOCK HEATER DETERMINATION DEVICE OF INTERNAL COMBUSTION ENGINE

CROSS REFERENCE TO RELATED APPLICATIONS

This application is based on and incorporates herein by reference Japanese Patent Applications No. 2007-148634 filed on Jun. 4, 2007 and No. 2007-148635 filed on Jun. 4, 2007.

BACKGROUND OF THE INVENTION

1. Field of the Invention

The present invention relates to a controller of an internal combustion engine having a function to energize a block heater, which is mounted to the engine, with an external power supply to keep an engine coolant warm while the engine is stopped in cold climate.

The present invention also relates to a cooling system abnormality diagnosis device and a block heater determination device of an internal combustion engine having a function to energize a block heater, which is mounted to the engine, with an external power supply to keep an engine coolant warm while the engine is stopped in cold climate.

2. Description of Related Art

A technology described in Patent document 1 (JP-A-2002-30959) attaches a block heater for freeze prevention to a cylinder block of an engine (an internal combustion engine). A power cord of the block heater is connected to a household power receptacle to energize the block heater while the engine is stopped in cold climate. Thus, the technology keeps an engine coolant warm to prevent the freeze in a cold district.

A technology described in Patent document 2 (Japanese Patent No. 3538545) estimates the coolant temperature based on an engine operation state. The technology compares the estimate of the coolant temperature and a sensing value of the coolant temperature sensed with a coolant temperature sensor respectively with predetermined values. The technology performs abnormality diagnosis of a radiator based on the comparison results.

A user arbitrarily decides whether to connect a plug of the power cord of the block heater to the external power receptacle to keep the engine warm during the engine stoppage. An abnormality diagnosis device on the vehicle side receives no information about existence/nonexistence of energization to the block heater. Therefore, the abnormality diagnosis device on the vehicle side performs the abnormality diagnosis of the radiator based on a behavior of the coolant temperature after a start-up without knowing whether the energization to the block heater exists or not.

However, the behavior of the coolant temperature after the start-up differs greatly depending on the existence/nonexistence of the energization to the block heater during the engine stoppage. Therefore, if the abnormality diagnosis of the radiator is performed based on the behavior of the coolant temperature while totally ignoring the influence of the existence/nonexistence of the energization to the block heater as in the conventional technology, there is a possibility that the abnormality/normality is erroneously diagnosed because of the variation in the behavior of the coolant temperature due to the existence/nonexistence of the energization to the block heater.

SUMMARY OF THE INVENTION

It is an object of the present invention to accurately determine existence or nonexistence of energization to a block heater.

It is another object of the present invention to provide a controller of an internal combustion engine capable of accurately determining existence or nonexistence of energization to a block heater during engine stoppage after a start-up.

It is yet another object of the present invention to prevent erroneous diagnosis of abnormality or normality of a cooling system caused by a variation in a behavior of coolant temperature due to existence or nonexistence of energization to a block heater during engine stoppage.

According to an aspect of the present invention, a controller of an internal combustion engine having a function to energize a block heater, which is mounted to the engine, with an external power supply to keep an engine coolant warm during an engine stoppage in cold climate has a block heater determination device for determining existence or nonexistence of energization to the block heater during engine stoppage based on a behavior of coolant temperature or a behavior of engine rotation speed immediately after a start of the engine.

Since circulation of the coolant in a coolant circulation line is also suspended during the engine stoppage, heat of the block heater is fully transferred to the coolant in the cylinder block of the engine near the block heater out of the coolant circulation line. However, the heat of the block heater is hard to be transferred to the coolant on the radiator side distant from the block heater. Therefore, there is a tendency that the coolant temperature on the radiator side becomes much lower than the coolant temperature on the cylinder block side. As a result, if the coolant in the coolant circulation line starts circulating due to the engine start, the coolant having been warmed within the cylinder block flows out to the radiator side and the cold coolant on the radiator side flows into the cylinder block to replace the warm coolant. Therefore, if the block heater is energized during the engine stoppage, there occurs a phenomenon that the coolant temperature in the cylinder block falls significantly immediately after the engine start as shown by a solid line "thw" in FIG. 5.

Furthermore, since combustion performance also falls due to lowering of the coolant temperature immediately after the engine start, there also occurs a phenomenon that the engine rotation speed (Ne in FIG. 5) falls significantly immediately after the engine start.

When the block heater is not energized, the coolant temperature on the radiator side is substantially the same as the coolant temperature on the cylinder block side. Therefore, the significant lowering of the coolant temperature or the significant lowering of the engine rotation speed as in the case of energizing the block heater does not occur immediately after the engine start.

Paying attention to the relationship between the existence/nonexistence of the energization to the block heater during the engine stoppage and the behavior of the coolant temperature or the engine rotation speed immediately after the engine start, the above aspect of the present invention determines the existence/nonexistence of the energization to the block heater during the engine stoppage based on the behavior of the coolant temperature or the behavior of the engine rotation speed immediately after the engine start. Accordingly, the existence/nonexistence of the energization to the block heater during the engine stoppage can be accurately determined after the engine start.

According to another aspect of the present invention, the block heater determination device determines the behavior of the coolant temperature or the behavior of the engine rotation speed immediately after the start based on at least one of a change amount (change width), change speed (rate of change), a change direction and an integration value (area) of the sensing value of the coolant temperature or the engine rotation speed. In short, the existence/nonexistence of the energization to the block heater during the engine stoppage may be determined by determining whether the significant decrease in the coolant temperature or the engine rotation speed occurs immediately after the engine start.

The behavior of the coolant temperature after the start differs greatly depending on whether the energization to the block heater during the engine stoppage exists or not. Therefore, in a system having an abnormality diagnosis device that performs abnormality diagnosis of a cooling system based on the behavior of the coolant temperature during the operation of the engine, there is a possibility that erroneous diagnosis of abnormality/normality of a radiator is caused by the variation in the behavior of the coolant temperature due to the existence/nonexistence of the energization to the block heater.

Therefore, according to another aspect of the present invention, the controller has an erroneous diagnosis prevention device that prohibits the abnormality diagnosis of the cooling system or corrects a condition for the abnormality diagnosis when the block heater determination device determines that the energization to the block heater exists. Thus, the erroneous diagnosis of the abnormality/normality of the cooling system caused by the variation in the behavior of coolant temperature due to the existence/nonexistence of the energization to the block heater during the engine stoppage can be prevented. As a result, the diagnosis accuracy and the reliability of the abnormality diagnosis of the cooling system can be improved.

According to another aspect of the present invention, a system has a coolant temperature estimation device that estimates the coolant temperature of the engine based on an operation state of the engine and corrects the coolant temperature estimate or control using the coolant temperature estimate when the block heater determination device determines that the energization to the block heater exists. The control using the coolant temperature estimate is fuel injection control, variable valve control, or the like. Thus, an estimation error of the coolant temperature due to the energization to the block heater can be corrected, improving estimation accuracy of the coolant temperature. In addition, accuracy of the control using the coolant temperature estimate can be improved.

According to another aspect of the present invention, a cooling system abnormality diagnosis device of an internal combustion engine that energizes a block heater, which is mounted to the engine, with an external power supply to keep an engine coolant warm during an engine stoppage in cold climate and that performs abnormality diagnosis of a cooling system based on a behavior of coolant temperature during an operation of the engine has a block heater determination device and an erroneous diagnosis prevention device. The block heater determination device determines existence/nonexistence of energization to the block heater during the engine stoppage. The erroneous diagnosis prevention device prohibits the abnormality diagnosis of the cooling system or corrects a condition for the abnormality diagnosis when the block heater determination device determines that the energization to the block heater exists.

With the construction, the abnormality diagnosis of the cooling system is prohibited or the condition for the abnormality diagnosis is corrected when it is determined that the energization to the block heater exists. Accordingly, erroneous diagnosis of the abnormality/normality of the cooling system due to the variation in the behavior of the coolant temperature caused by the existence/nonexistence of the energization to the block heater during the engine stoppage can be prevented. As a result, diagnosis accuracy and reliability of the abnormality diagnosis of the cooling system can be improved.

If the block heater is not energized during the engine stoppage, the coolant temperature falls in accordance with temperature difference between the coolant temperature and ambient temperature at the time when the operation of the engine is stopped and with time length of the engine stoppage. If the block heater is energized during the engine stoppage, the lowering of the coolant temperature is suppressed by the heat generation from the block heater. By using such the characteristic, the determination method of the existence/nonexistence of the energization to the block heater may determine the existence/nonexistence of the energization to the block heater using the engine stoppage time length, the coolant temperature and the ambient temperature (intake air temperature) or information correlated with them.

If the operation of the engine is stopped before the warm-up of the engine is completed, the coolant temperature at the time when the operation of the engine is stopped is low, and the difference between the coolant temperature and the ambient temperature is small. Therefore, the decrease amount of the coolant temperature during the engine stoppage reduces, and it is difficult to distinguish the state from the case where the energization to the block heater exists.

Therefore, according to another aspect of the present invention, the determination of the existence/nonexistence of the energization to the block heater is prohibited when the coolant temperature at the time when the operation of the engine is stopped is equal to or lower than predetermined temperature. Thus, erroneous determination of the existence/nonexistence of the energization to the block heater can be prevented when the coolant temperature at the time when the operation of the engine is stopped is low and the difference between the coolant temperature and the ambient temperature is small.

According to another aspect of the present invention, a system has a coolant temperature estimation device that estimates the coolant temperature of the engine based on an operation state of the engine and corrects the coolant temperature estimate when the block heater determination device determines that the energization to the block heater exists. Thus, an estimation error of the coolant temperature due to the energization to the block heater can be corrected, improving estimation accuracy of the coolant temperature.

According to yet another aspect of the present invention, the system has a self-starter that performs self-start of an ECU (an electronic control unit) by temporarily turning on power supply to the ECU to perform leak diagnosis of an evaporative gas purge system and the like when a predetermined time passes after the operation of the engine is stopped. The system determines the existence/nonexistence of the energization to the block heater by using the self-start.

In the system that performs the self-start of the ECU by temporarily turning on the power supply to the ECU to perform the leak diagnosis and the like when the predetermined time passes after the operation of the engine is stopped, engine stoppage time length from the stop of the engine operation to the self-start is invariably constant. Therefore, if the existence/nonexistence of the energization to the block heater is determined using the self-start, lowering of the determination accuracy due to the variation in the engine stoppage time length can be avoided. Accordingly, the existence/nonexistence of the energization to the block heater can be determined with high accuracy and adaptation and evaluation of a determination condition using the engine stoppage time length as a parameter becomes unnecessary. Thus, work of the adaptation and the evaluation of the determination condition becomes easy.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
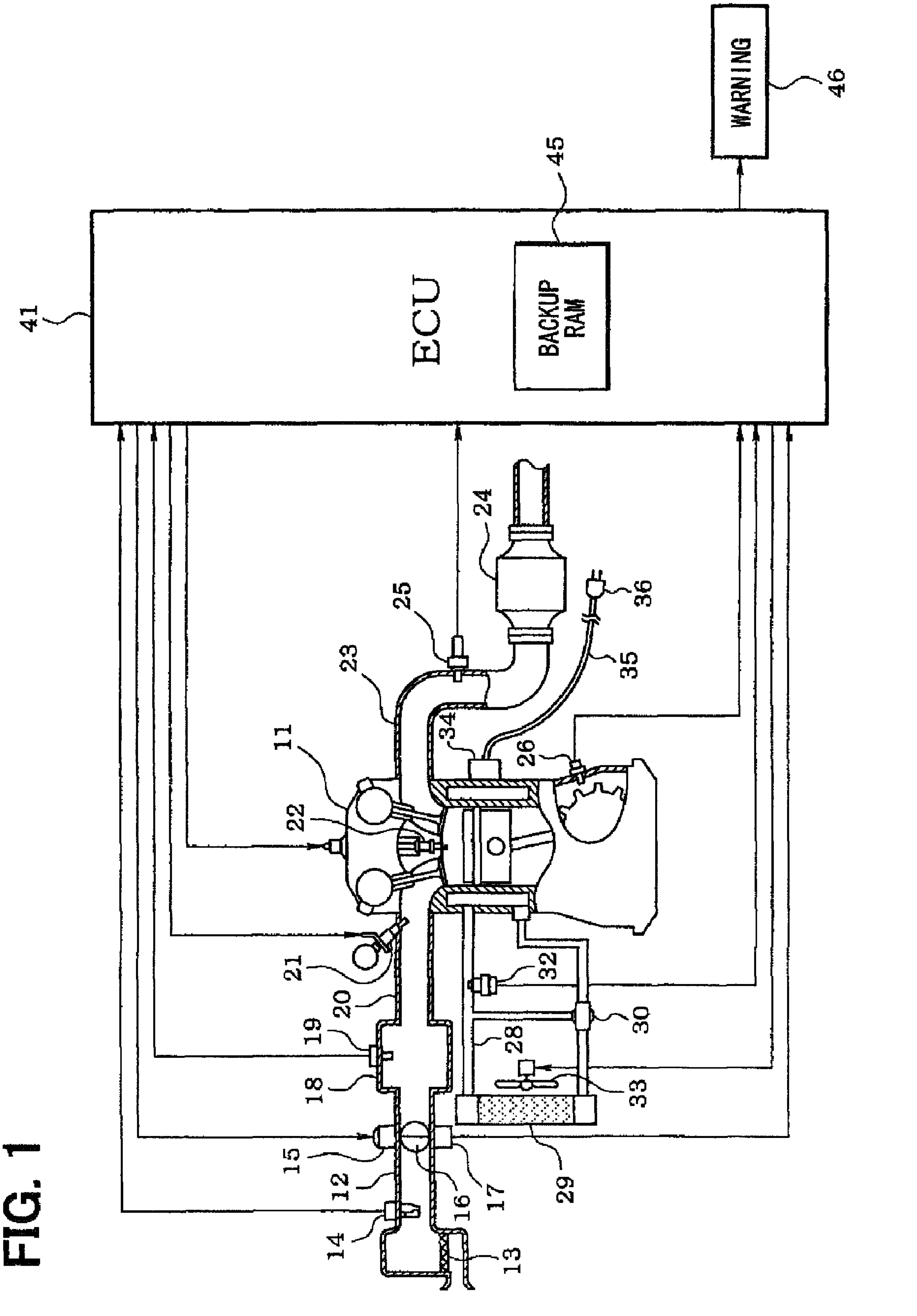
FIG. 1 is a schematic structural diagram showing an engine control system according to a first embodiment of the present invention.

Hereinafter, a first embodiment of the present invention will be described with reference to drawings. First, a general structure of an engine control system according to the present embodiment will be explained with reference to FIG. 1. An air cleaner 13 is provided in the most upstream portion of an intake pipe 12 of an engine 11 as an internal combustion engine. An airflow meter 14 for sensing an intake air quantity is provided downstream of the air cleaner 13. An intake air temperature sensor (not shown) for sensing intake air temperature (ambient temperature "tha") is provided to the airflow meter 14. A throttle valve 16, whose opening degree is regulated by a motor 15, and a throttle position sensor 17 for sensing the opening degree (a throttle opening degree) of the throttle valve 16 are provided downstream of the airflow meter 14.

A surge tank 18 is provided downstream of the throttle valve 16, and an intake pipe pressure sensor 19 for sensing intake pipe pressure is provided in the surge tank 18. An intake manifold 20 for introducing the air into each cylinder of the engine 11 is provided to the surge tank 18. An injector 21 for injecting fuel is attached near an inlet port of the intake manifold 20 of each cylinder. A spark plug 22 is attached to a cylinder head of the engine 11 for each cylinder for igniting a mixture gas in the cylinder with spark discharge from the spark plug 22.

A catalyst 24 such as a three-way catalyst for purifying CO, HC, NOx and the like contained in exhaust gas is provided in an exhaust pipe 23 (exhaust passage) of the engine 11. An exhaust gas sensor 25 for sensing an air fuel ratio, a rich/lean condition of the exhaust gas and the like is provided upstream of the catalyst 24. A crank angle sensor 26 (a rotation speed sensing device) is attached to the engine 11 and outputs a pulse signal every time a crankshaft rotates by a predetermined crank angle. The crank angle and engine rotation speed Ne are sensed based on the output signal of the crank angle sensor 26.

A radiator 29 for radiating heat of the coolant, a thermostat valve 30 for controlling a coolant circulation flow rate to the radiator 29 and the like are provided in a coolant circulation line 28 that circulates the coolant of the engine 11. A coolant temperature sensor 32 (a coolant temperature sensing device) is provided near a coolant outlet of the engine 11 in the coolant circulation line 28. The coolant temperature sensor 32 senses temperature of the coolant (coolant temperature "thw") flowing from the engine 11 into the coolant circulation line 28. The coolant temperature sensor 32 may be attached to a cylinder block of the engine 11. A cooling fan 33 for performing forced cooling of the coolant is provided on a rear side of the radiator 29.

A block heater 34 for freeze prevention is attached to the cylinder block of the engine 11. A power cord 35 is connected to the block heater 34. A user connects a plug 36 of the power cord 35 of the block heater 34 to a household power receptacle (not shown) as an external power supply to energize the block heater 34 while the engine is stopped in cold climate. Thus, the engine coolant is kept warm to prevent the freeze. Before starting the engine 11 the user detaches the plug 36 of the power cord 35 from the household power receptacle and stores the plug 36 in a proper part in an engine compartment.

There is no need to keep the coolant warm with the block heater 34 in the case other than the cold climate. Therefore, in such the case, the power cord 35 of the block heater 34 is kept stored in the engine compartment even during the engine stoppage and the block heater 34 is not energized.

An ECU 41 includes a microcomputer as a main component. The ECU 41 executes various kinds of engine control programs stored in an incorporated ROM (a storage medium) to control a fuel injection quantity of the injector 21 and ignition timing of the spark plug 22 according to an engine operation state.

The ECU 41 executes a block heater determination routine shown in FIG. 2 (described in more detail later) to determine existence/nonexistence of the energization to the block heater 34 during the engine stoppage based on a behavior of the coolant temperature "thw" (i.e., a sensing value of the coolant temperature sensor 32) immediately after the engine start. If it is determined that the energization to the block heater 34 exists, the ECU 41 corrects the coolant temperature "thwe" estimated through a coolant temperature estimation routine shown in FIG. 3 (described in more detail later). If it is determined that the energization to the block heater 34 exists, the ECU 41 prohibits abnormality diagnosis of the cooling system performed through a cooling system abnormality diagnosis routine shown in FIG. 4 (described in more detail later).

Figure 5:
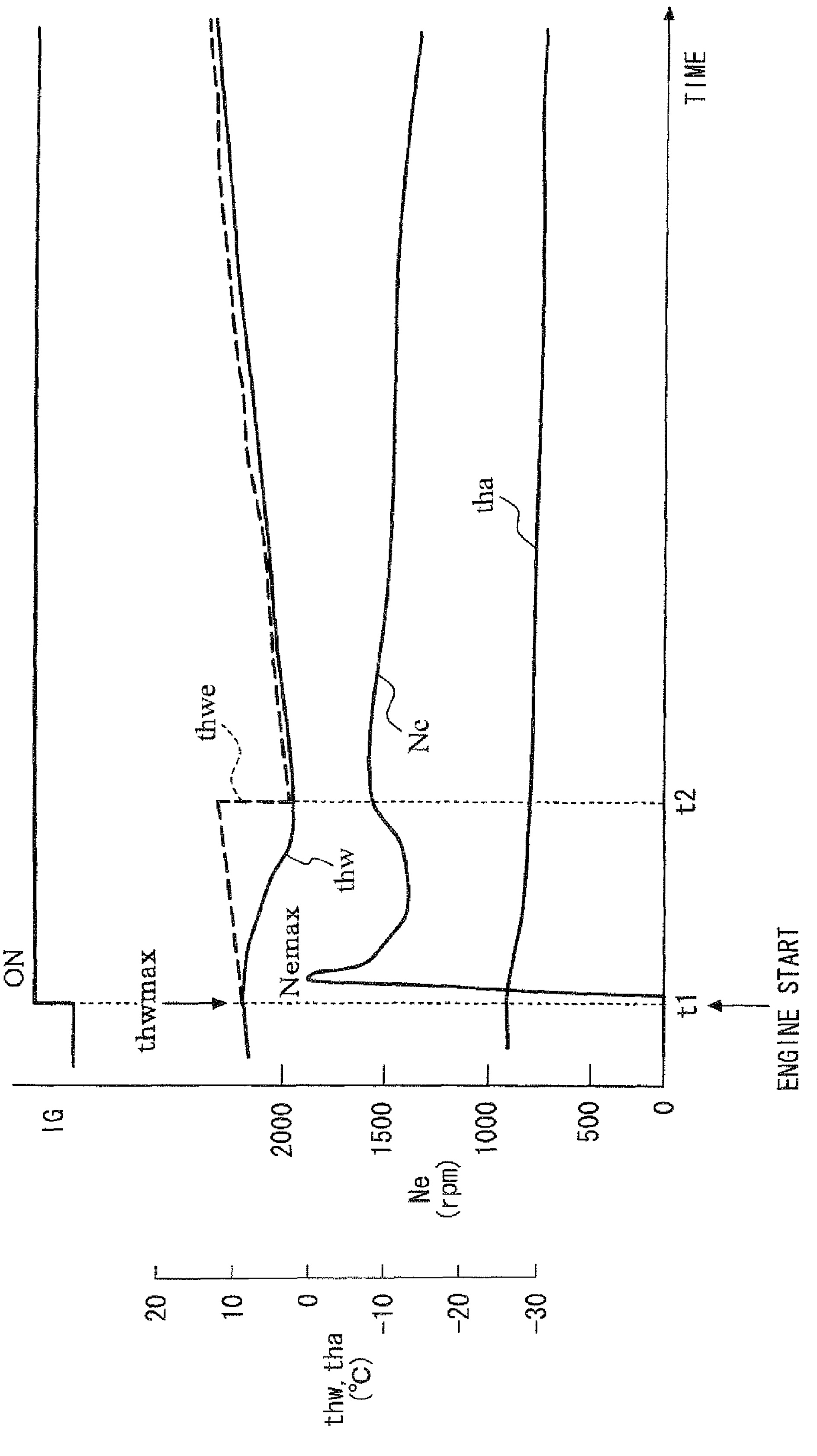
FIG. 5 is a time chart explaining a control example according to the first embodiment.
Figure 6:
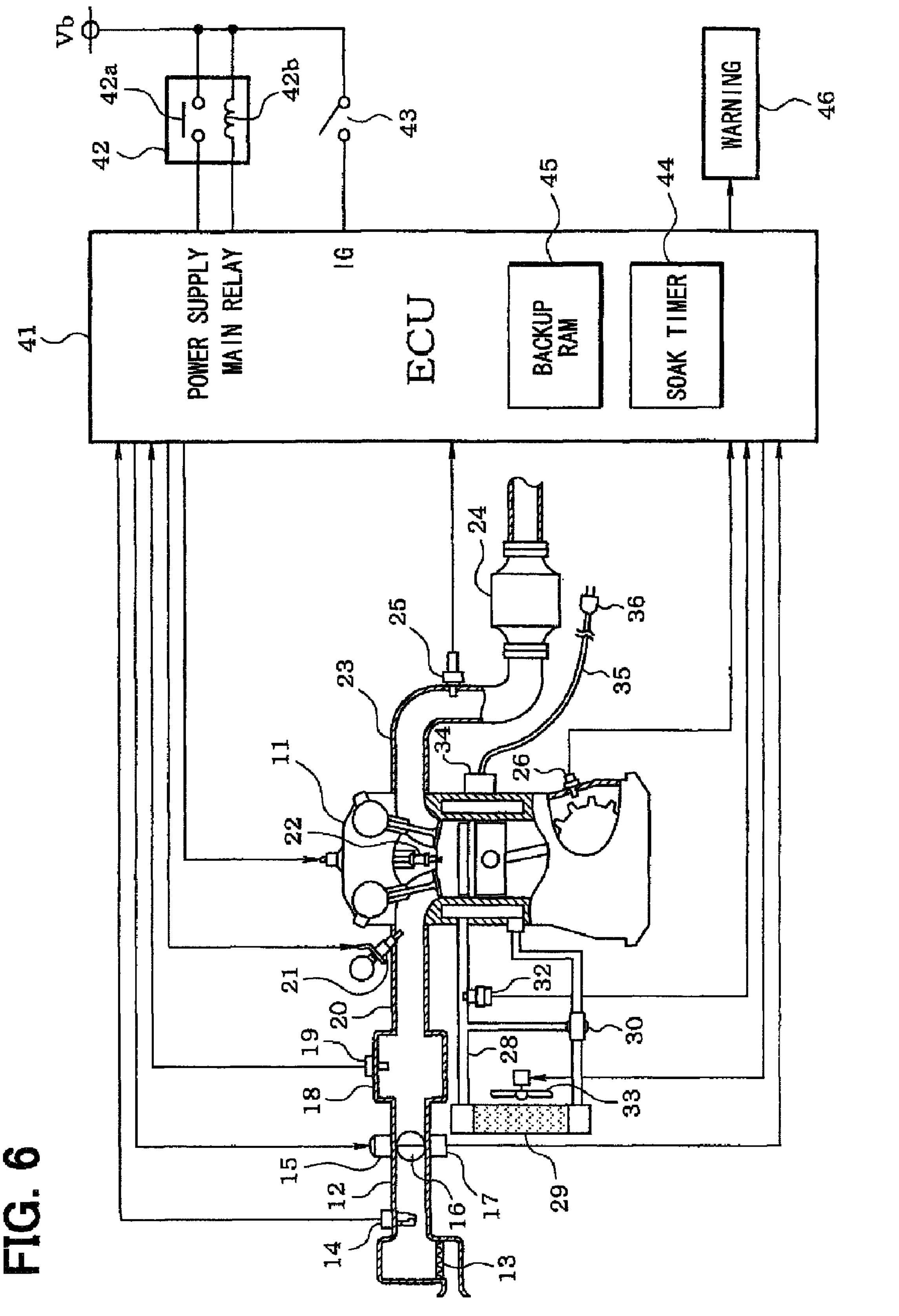
FIG. 6 is a schematic structural diagram showing an engine control system according to a second embodiment of the present invention.

Next, a method of determining the existence/nonexistence of the energization to the block heater 34 during the engine stoppage according to the present embodiment will be explained. During the engine stoppage, the circulation of the coolant in the coolant circulation line 28 is also stopped. Therefore, the heat of the block heater 34 is sufficiently transferred to the coolant in the cylinder block of the engine 11 near the block heater 34 in the coolant circulation line 28. However, the heat of the block heater 34 is hard to be transferred to the coolant on the radiator 29 side distant from the block heater 34. Therefore, there is a tendency that the coolant temperature on the radiator 29 side becomes much lower than the coolant temperature on the engine 11 side. As a result, if the coolant in the coolant circulation line 28 starts circulating due to the engine start, the coolant having been warmed within the engine 11 flows out to the radiator 29 side, and the cold coolant on the radiator 29 side flows into the engine 11 to replace the warm coolant. Therefore, if the block heater 34 is energized during the engine stoppage, as shown in FIG. 5, there occurs a phenomenon that the coolant temperature thw in the engine 11 (the sensing value of the coolant temperature sensor 32) falls significantly immediately after the engine start (timing t1 in the figure). Furthermore, since combustion performance also falls due to the lowering of the coolant temperature thw immediately after the engine start, there also occurs a phenomenon that the engine rotation speed Ne falls significantly immediately after the engine start.

When the block heater 34 is not energized during the engine stoppage, the coolant temperature on the radiator 29 side is substantially the same as the coolant temperature on the engine 11 side. Therefore, the significant decrease of the coolant temperature or the significant decrease of the engine rotation speed immediately after the engine start as in the case of energizing the block heater 34 as mentioned above does not occur.

Paying attention to the relationship between the existence/nonexistence of the energization to the block heater 34 during the engine stoppage and the behavior of the coolant temperature or the engine rotation speed immediately after the engine star, the present invention provides a scheme of determining the existence/nonexistence of the energization to the block heater 34 during the engine stoppage based on the behavior of the coolant temperature or the behavior of the engine rotation speed immediately after the engine start. In this case, the behavior of the coolant temperature or the behavior of the engine rotation speed immediately after the start may be determined based on at least one of a change amount (change width), change speed (rate of change), a change direction and an integration value (area) of the sensing value of the coolant temperature or the engine rotation speed. In short, the existence/nonexistence of the energization to the block heater 34 during the engine stoppage may be determined by determining whether significant decrease in the coolant temperature or significant decrease in the engine rotation speed occurs immediately after the engine start.

Next, processing contents of each of the routines shown in FIGS. 2 to 4 executed by the ECU 41 will be explained.

Figure 2:
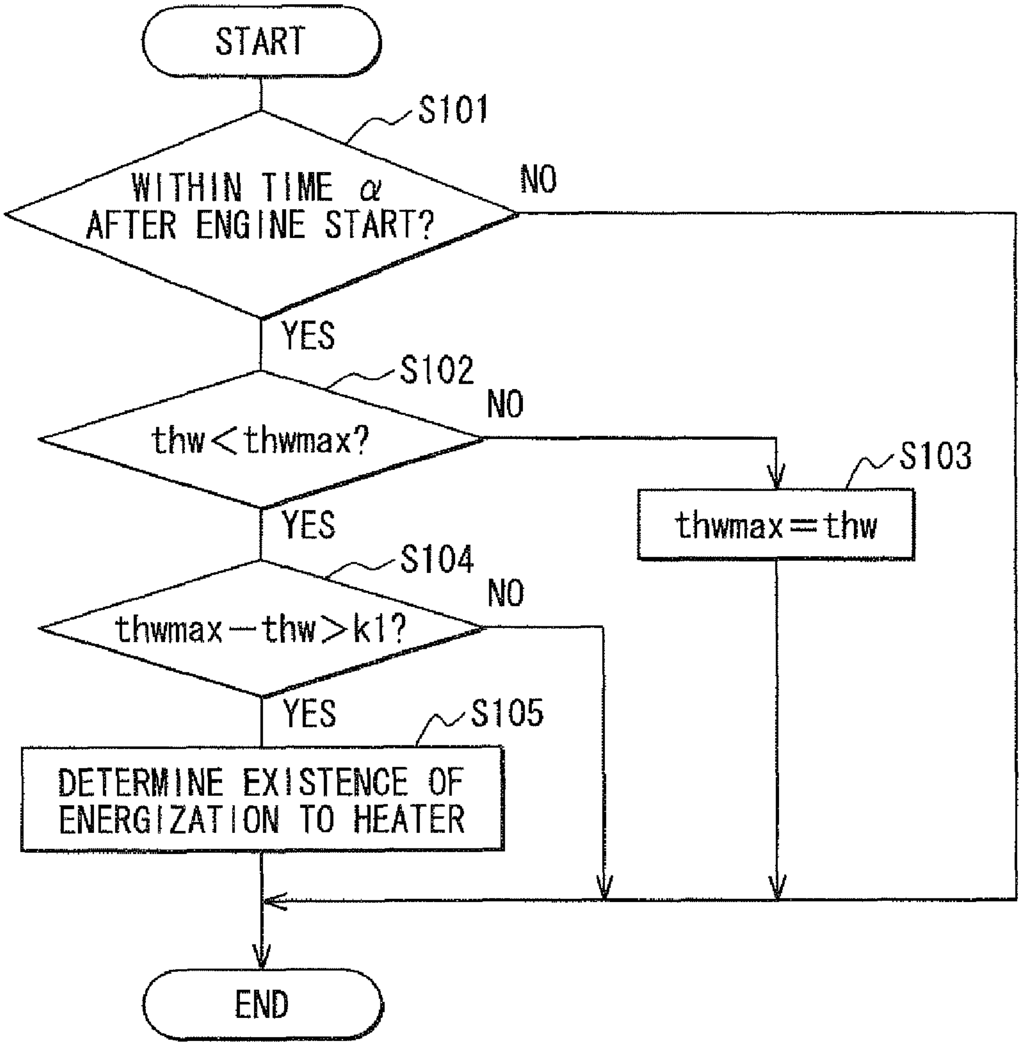
FIG. 2 is a flowchart showing a processing flow of a block heater determination routine according to the first embodiment.

The block heater determination routine shown in FIG. 2 (functioning as a block heater determination device) is started in a predetermined cycle (for example, 32 msec cycle) while power supply to the ECU 41 is ON, If the routine is started, first, in S101 (here, S denotes "step"), it is determined whether the present time is immediately after the engine start based on whether the present time is within a predetermined time $\alpha$ (for example, 30 sec) after the engine start. It is determined that the present time is not immediately after the engine start if the present time is not within the predetermined time a after the engine start. In this case, the routine is ended without performing subsequent processing.

If it is determined that the present time is within the predetermined time a after the engine start in S101, it is determined that the present time is immediately after the engine start and the process proceeds to S102. In S102, it is determined whether the present coolant temperature thw sensed with the coolant temperature sensor 32 is lower than the highest coolant temperature "thwmax" stored in the RAM (memory) of the ECU 41. The highest coolant temperature thwmax is the maximum value of the coolant temperature thw sensed with the coolant temperature sensor 32 during a period from the engine start to the present time.

If it is determined that the present coolant temperature thw is equal to or higher than the highest coolant temperature thwmax in S102, the process proceeds to S103. In S103, data of the highest coolant temperature thwmax stored in the RAM of the ECU 41 is rewritten with the present coolant temperature thw (thwmax=thw), and the routine is ended.

If it is determined that the present coolant temperature thw is lower than the highest coolant temperature thwmax in S102, the process proceeds to S104. In S104, it is determined whether difference (thwmax−thw) between the highest coolant temperature thwmax and the present coolant temperature thw, i.e., a coolant temperature decrease amount (thwmax−thw) from the engine start to the present time, is greater than a determination value k1.

If it is determined that the coolant temperature decrease amount (thwmax−thw) from the engine start to the present time is greater than the determination value k1, the process proceeds to S105. In S105, it is determined that the energization to the block heater 34 exists. If it is determined that the coolant temperature decrease amount (thwmax−thw) from the engine start to the present time is equal to or less than the determination value k1, it is determined that the energization to the block heater 34 does not exist and the routine is ended. The determination value k1 may be a preset constant value (for example, 5 degrees C.). Alternatively, for example, the determination value k1 may be variably set based on a map or the like in accordance with the coolant temperature (the highest coolant temperature thwmax) in the initial stage of the engine start.

As mentioned above, the determination method of the existence/nonexistence of the energization to the block heater 34 may be changed arbitrarily. For example, in S104, it may be determined whether a difference between the highest engine rotation speed Nemax in the period from the engine start to the present time and the present engine rotation speed Ne, i.e., an engine rotation speed decrease amount (Nemax−Ne) from the highest engine rotation speed Nemax after the engine start to the present engine rotation speed Ne, is greater than a determination value. Thus, it may be determined that the energization to the block heater 34 exists if the difference (Nemax−Ne) between the highest engine rotation speed Nemax and the present engine rotation speed Ne is greater than the determination value.

Figure 3:
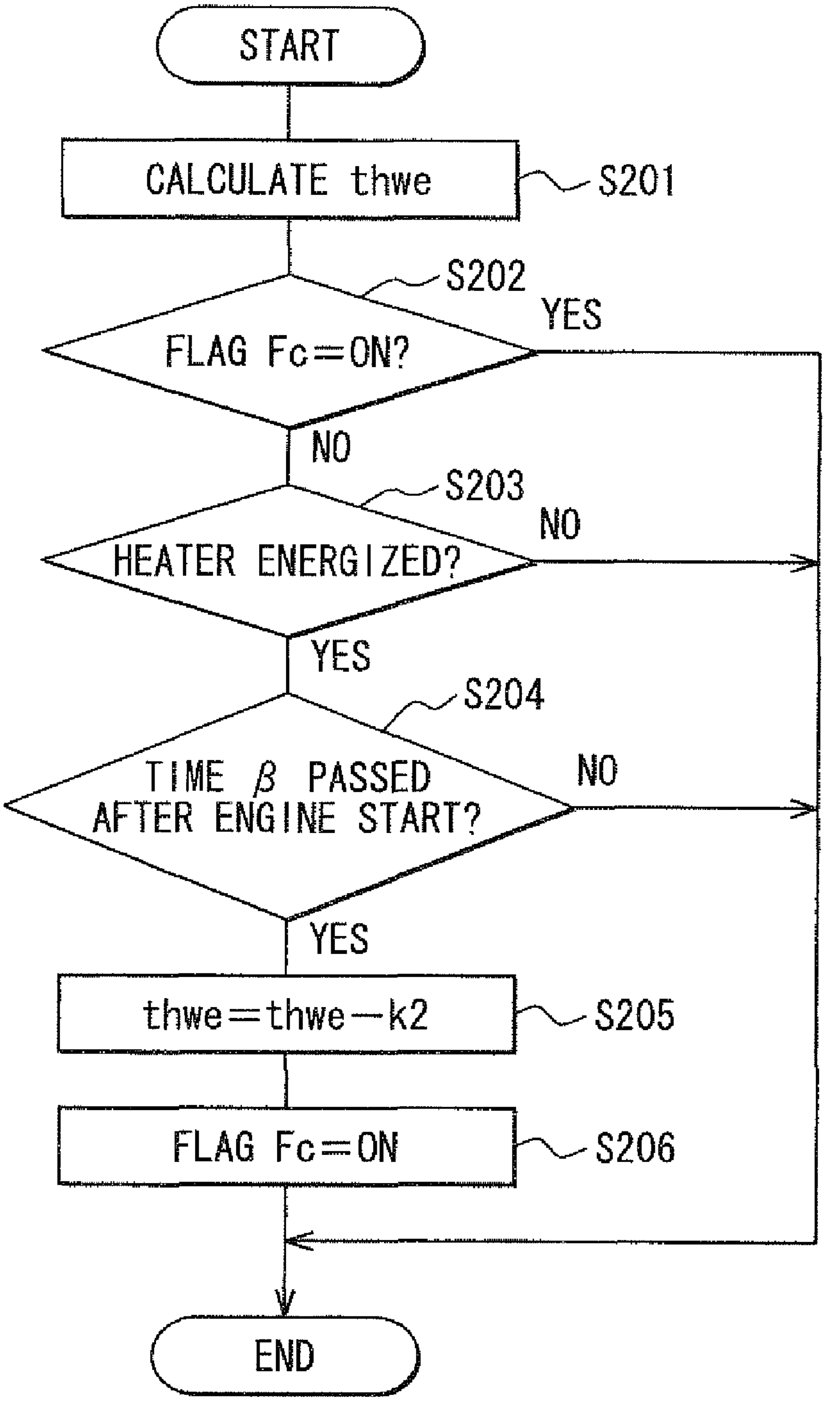
FIG. 3 is a flowchart showing a processing flow of a coolant temperature estimation routine according to the first embodiment.

The coolant temperature estimation routine shown in FIG. 3 (functioning as a coolant temperature estimation device) is started in a predetermined cycle (for example, 32 msec cycle) while the power supply to the ECU 41 is ON. If the routine is started, the estimation coolant temperature thwe is first calculated in S201 using an estimation coolant temperature initial value (for example, a coolant temperature sensing value in the initial stage of the engine start) and a thermal load parameter that contributes to increase of the coolant temperature out of the engine operation parameters. The thermal load parameter may be calculated from an engine load integration value and an integration cooling loss value (a cooling loss value due to a heater for indoor heating or running wind).

Then, the process goes to S202, in which it is determined whether block heater correction (explained in detail later) of the estimation coolant temperature thwe has been already performed based on whether a block heater correction completion flag Fc is set at ON or not. If the block heater correction completion flag Fc is ON (i.e., if the block heater correction has been already performed), the routine is ended without executing subsequent processing.

If it is determined that the block heater correction completion flag Fc is OFF (i.e., the block heater correction has not been performed yet) in S202, the process goes to S203, in which it is determined whether the existence of the energization to the block heater 34 is determined based on the processing result of the block heater determination routine shown in FIG. 2. If it is determined that the energization to the block heater 34 does not exist, the routine is ended without performing subsequent processing.

If it is determined that the energization to the block heater 34 exists, the process proceeds to S204, in which it is determined whether the present time is execution timing of the block heater correction based on whether a predetermined time β (for example, 30 sec) has passed after the engine start. If it is determined that the present time is not the execution timing of the block heater correction, the routine is ended without performing subsequent processing.

Then, the process proceeds to S205 when the predetermined time β passes after the engine start and the execution timing of the block heater correction is reached. In S205, a value calculated by subtracting a block heater correction value k2 from the estimation coolant temperature thwe calculated in S201 is set as the estimation coolant temperature thwe again.

$$thwe=thwe-k2$$

The block heater correction value k2 corresponds to the coolant temperature decrease amount immediately after the engine start in the case where the energization to the block heater 34 exists. The block heater correction value k2 may be set beforehand at a constant value (for example, 10 degrees C.) through experiments, simulations or the like. Alternatively, for example, the block heater correction value k2 may be varied based on a map or the like in accordance with the coolant temperature (the highest coolant temperature thwmax) in the initial stage of the engine start.

After performing the block heater correction of the estimation coolant temperature thwe in this manner, the process proceeds to S206, in which the block heater correction completion flag Fc is set to ON to indicate that the block heater correction has been performed. Then, the routine is ended.

Figure 4:
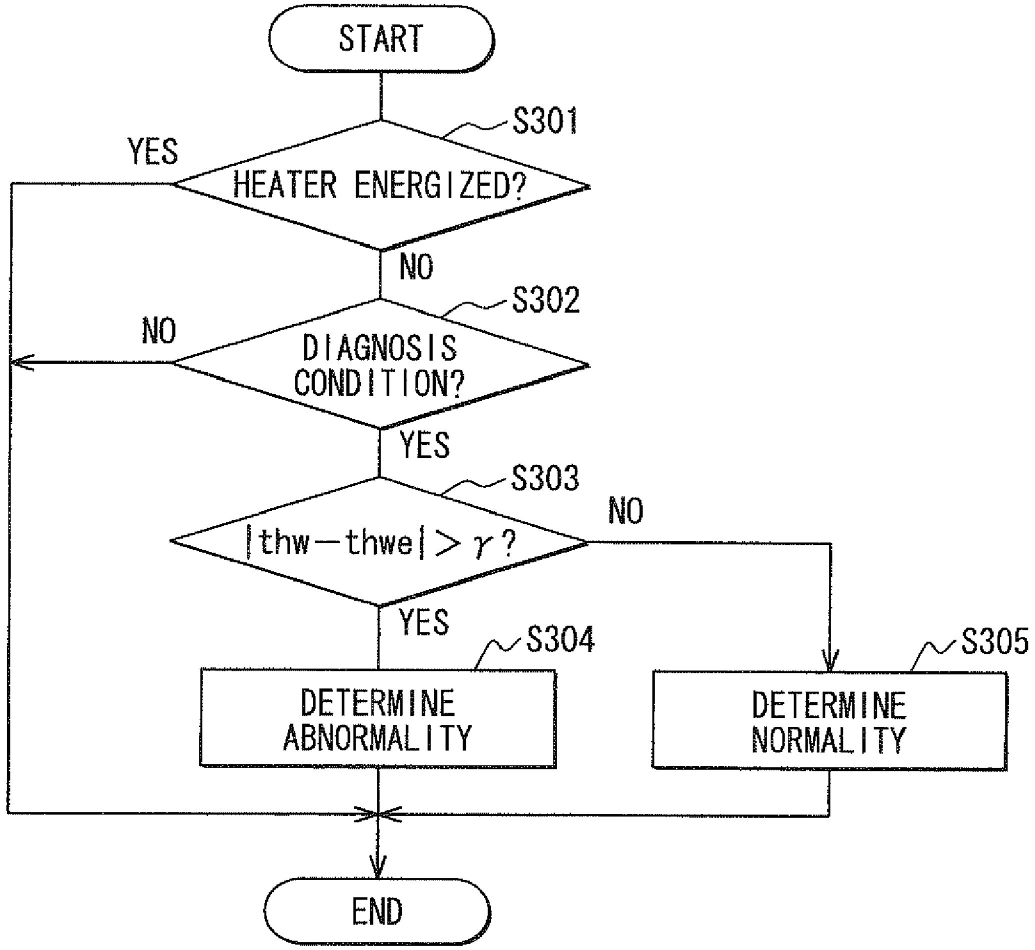
FIG. 4 is a flowchart showing a processing flow of a cooling system abnormality diagnosis routine according to the first embodiment.

The cooling system abnormality diagnosis routine shown in FIG. 4 (functioning as an abnormality diagnosis device) is started in a predetermined cycle (for example, 32 msec cycle) while the power supply to the ECU 41 is ON. If the routine is started, first, in S301, it is determined whether the existence of the energization to the block heater 34 is determined based on the processing result of the block heater determination routine shown in FIG. 2. If it is determined that the energization to the block heater 34 exists, the routine is ended without performing subsequent abnormality diagnosis processing. The processing of S301 functions as an erroneous diagnosis prevention device.

If it is determined that the energization to the block heater 34 does not exist in S301, the process proceeds to S302, in which it is determined whether a cooling system abnormality diagnosis execution condition is established, for example, based on whether engine warm-up operation is in progress. If the cooling system abnormality diagnosis execution condition is not established, the routine is ended as it is.

If it is determined that the cooling system abnormality diagnosis execution condition is established in S302, the process goes to S303. In S303, existence/nonexistence of an abnormality in the cooling system (the thermostat valve 30, the coolant temperature sensor 32, the radiator 29 and the like) is determined based on whether an error between the actual coolant temperature thw sensed with the coolant temperature sensor 32 and the estimation coolant temperature thwe calculated in the coolant temperature estimation routine shown in FIG. 3 (i.e., an absolute value of the difference between the actual coolant temperature thw and the estimation coolant temperature thwe) is greater than an abnormality determination value γ. If it is determined that the error between the actual coolant temperature thw and the estimation coolant temperature thwe is equal to or less than the abnormality determination value γ in S303, the process proceeds to S305, in which it is determined that the cooling system is normal and the routine is ended.

If it is determined that the error between the actual coolant temperature thw and the estimation coolant temperature thwe is greater than the abnormality determination value γ in S303, the process proceeds to S304. In S304, it is determined that the cooling system is abnormal and warning is provided to a driver by turning on a warning lamp 46 provided in an instrument panel at the driver's seat or by indicating a warning in an alarm display. Also, in S304, abnormality information (an abnormality code) is stored in a backup RAM 45 of the ECU 41, and the routine is ended.

Next, a control example of the above-described embodiment will be explained with reference to a time chart shown in FIG. 5. FIG. 5 shows an example of energizing the block heater 34 during the engine stoppage. If an ignition switch is turned on (IG=ON) to start the engine 11 at time t1 shown in FIG. 5, the coolant in the coolant circulation line 28 starts circulating. Thus, the coolant having been warmed within the engine 11 by heat generation of the block heater 34 during the engine stoppage flows out to the radiator 29 side, and the cold coolant on the radiator 29 side flows into the engine 11 to replace the warm coolant. Therefore, if the block heater 34 is energized during the engine stoppage, there occurs a phenomenon that the coolant temperature thw in the engine 11 (the sensing value of the coolant temperature sensor 32) falls significantly immediately after the engine start. Furthermore, since the combustion performance also falls due to the decrease of the coolant temperature thw immediately after the engine start, there also occurs a phenomenon that the engine rotation speed Ne falls significantly immediately after the engine start.

After the engine start, the existence/nonexistence of the energization to the block heater 34 during the engine stoppage is determined based on whether the coolant temperature decrease amount (thwmax−thw) from the engine start to the present time, the engine rotation speed decrease amount (Nemax−Ne) from the highest engine rotation speed Nemax after the engine start or the like is greater than the determination value.

In the example of FIG. 5, it is determined that the energization to the block heater 34 during the engine stoppage exists. Therefore, subtraction correction of the estimation coolant temperature thwe is performed with the block heater correction value k2 at the time t2 when a predetermined time (for example, 30 sec) passes after the engine start and the timing for the block heater correction is reached.

According to the above-described present embodiment, paying attention to the relationship between the existence/nonexistence of the energization to the block heater 34 during the engine stoppage and the behavior of the coolant temperature (or the behavior of the engine rotation speed) immediately after the engine start, the existence/nonexistence of the energization to the block heater 34 during the engine stoppage is determined based on the behavior of the coolant temperature (or the behavior of the engine rotation speed) immediately after the engine start. Accordingly, the existence/nonexistence of the energization to the block heater 34 during the engine stoppage can be accurately determined after the engine start.

Moreover, according to the present embodiment, the abnormality diagnosis of the cooling system is prohibited when it is determined that the energization to the block heater 34 during the engine stoppage exists. Accordingly, erroneous diagnosis of the abnormality/normality of the cooling system due to the variation in the behavior of the coolant temperature caused by the existence/nonexistence of the energization to the block heater 34 during the engine stoppage can be prevented. As a result, the diagnosis accuracy and the reliability of the abnormality diagnosis of the cooling system can be improved. In addition, when it is determined that the energization to the block heater 34 during the engine stoppage exists, the abnormality diagnosis conditions (the abnormality determination value, the coolant temperature and the like) may be corrected instead of prohibiting the abnormality diagnosis of the cooling system.

Moreover, according to the present embodiment, the coolant temperature estimate is corrected when it is determined that the energization to the block heater 34 during the engine stoppage exists. Accordingly, the estimation error of the coolant temperature due to the energization to the block heater 34 during the engine stoppage can be corrected, improving estimation accuracy of the coolant temperature. Instead of correcting the coolant temperature estimate, control using the coolant temperature estimate (for example, fuel injection control, variable valve control, ignition timing control and the like) may be corrected.

The present invention is not limited to the above-described embodiment. For example, the present invention may be implemented by arbitrarily modifying the method of the abnormality diagnosis of the cooling system or the estimation method of the coolant temperature.

Next, a second embodiment of the present invention will be described with reference to drawings. Description of the structures similar to those of the first embodiment is not repeated here.

The outputs of the various sensors such as the coolant temperature sensor 32 are inputted to a control circuit 41 (referred to as an ECU, hereinafter). Power supply voltage Vb is supplied to a power supply terminal of the ECU 41 from an in-vehicle battery (not shown) through a main relay 42. A relay drive coil 42*b* driving a relay contact 42*a* of the main relay 42 is connected to a main relay control terminal of the ECU 41. If the relay drive coil 42*b* is energized, the relay contact 42*a* is turned on and the power supply voltage Vb is supplied to the ECU 41 and the like. If the relay drive coil 42*b* is de-energized, the relay contact 42*a* is turned off and the power supply to the ECU 41 and the like is turned off.

An ON/OFF signal of an ignition switch 43 (referred to as an IG switch, hereinafter) is inputted to an IG switch terminal of the ECU 41. If the IG switch 43 is turned on, the main relay 42 is turned on to start the power supply to the ECU 41 and the like. If the IG switch 43 is turned off, the main relay 42 is turned off after the processing for stopping the engine is performed. Thus, the power supply to the ECU 41 and the like is turned off.

The ECU 41 incorporates a soak timer 44 that performs timer operation by using a backup power supply (not shown) as a power supply. The soak timer 44 starts the timer operation after the engine stop (i.e., after the IG switch 43 is turned off) to measure an elapsed time after the engine stop. As mentioned above, if the IG switch 43 is turned off, the main relay 42 is turned off to stop the power supply to the ECU 41 and the like. In order to perform leak diagnosis of an evaporative purge system (not shown) during the engine stoppage, if the time (the elapsed time after the engine stop) measured by the soak timer 44 reaches a preset time (for example, 5 hours), the drive circuit of the main relay control terminal of the ECU 41 is operated by using the backup power supply of the ECU 41 as the power supply to temporarily turn on the main relay 42. Thus, the power supply to the ECU 41 is turned on to perform self-start of the ECU 41. The ECU 41 performs the leak diagnosis of the evaporative purge system on the occasion of the self-start. In addition, the ECU 41 determines the existence/nonexistence of the energization to the block heater 34 by using the data of the coolant temperature thw sensed with the coolant temperature sensor 32 and the like on the occasion of the self-start.

The ECU 41 is constructed mainly by a microcomputer and executes various kinds of engine control programs stored in an incorporated ROM (a storage medium). Thus, the ECU 41 controls a fuel injection quantity of the injector 21 and ignition timing of the spark plug 22 in accordance with the engine operation state.

The ECU 41 executes routines shown in FIGS. 7 to 9 (described in more detail later) to determine the existence/nonexistence of the energization to the block heater 34 during the engine stoppage. If it is determined that the energization to the block heater 34 exists, the ECU 41 prohibits abnormality diagnosis of the cooling system performed through a cooling system abnormality diagnosis routine shown in FIG. 11 (described in more detail later). If it is determined that the energization to the block heater 34 exists, the ECU 41 corrects the coolant temperature estimated through a coolant temperature estimation routine shown in FIG. 10 (described in more detail later).

Figure 12:
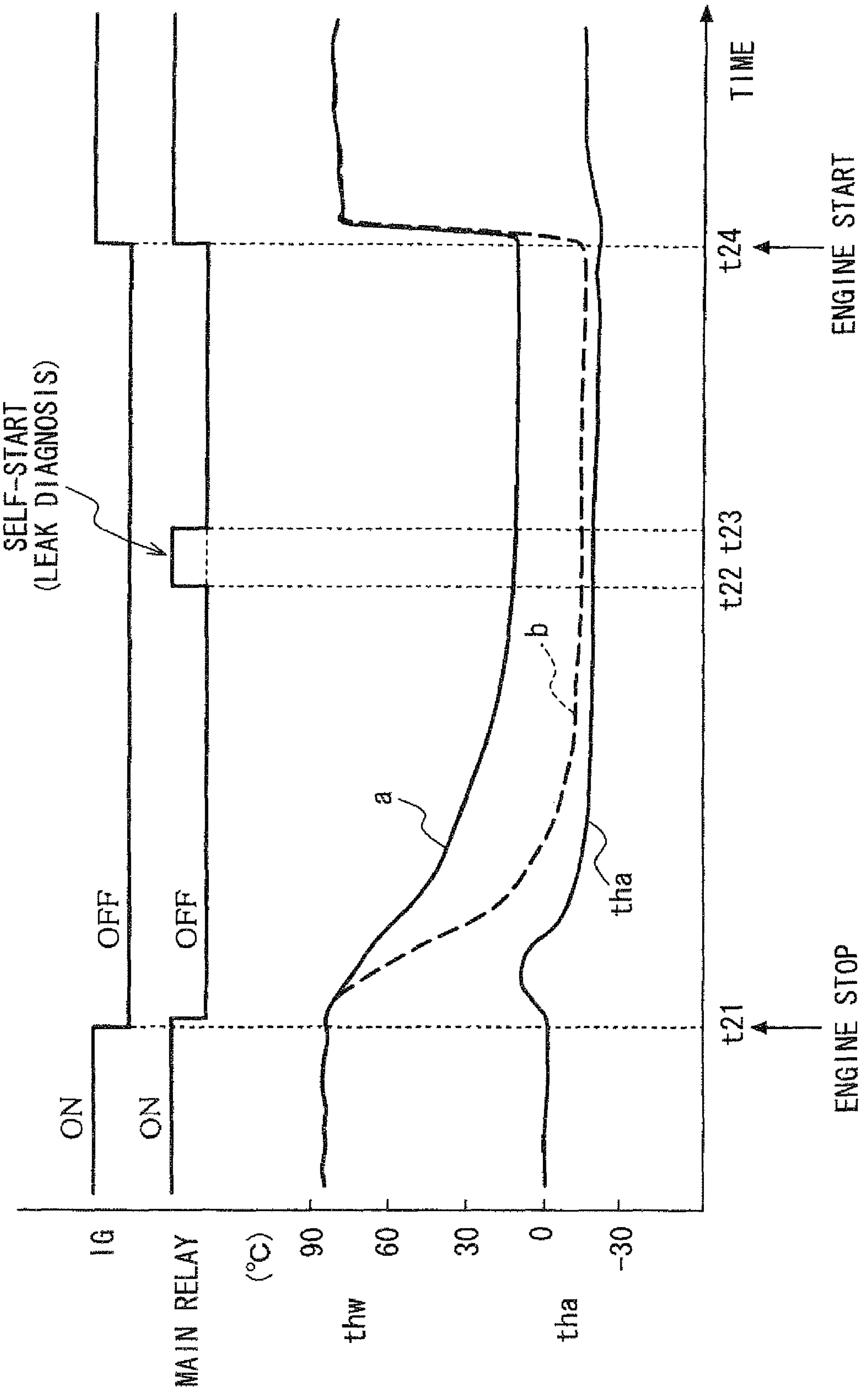
FIG. 12 is a time chart explaining a control example according to the second embodiment.

If the block heater 34 is not energized during the engine stoppage, the coolant temperature thw lowers in accordance with a difference between the coolant temperature thw and the ambient temperature tha at the time when the operation of the engine 11 is stopped and with the engine stoppage time length as shown by a broken line "b" in FIG. 12. If the block heater 34 is energized during the engine stoppage, the lowering of the coolant temperature thw is suppressed by the heat generation of the block heater 34 as shown by a solid line "a" in FIG. 12. By using this characteristic, the determination method of the existence/nonexistence of the energization to the block heater 34 during the engine stoppage may determine the existence/nonexistence of the energization to the block heater 34 by using the engine stoppage time length, the coolant temperature thw and the ambient temperature tha (the intake air temperature) or information correlated with them.

For example, one or combination of two or more of following three determination methods (1) to (3) may be employed.

(1) A method of determining the existence/nonexistence of the energization to the block heater 34 by using a relationship between a coolant temperature change amount during the engine stoppage and the engine stoppage time length. The coolant temperature change amount is a difference between the coolant temperature at the time when the operation of the engine 11 is stopped and the coolant temperature as of the start.

(2) A method of determining the existence/nonexistence of the energization to the block heater 34 by using a relationship between a difference between the coolant temperature and the ambient temperature (the intake air temperature) as of the start and the engine stoppage time length.

(3) A method of estimating the coolant temperature as of the start based on the coolant temperature and the ambient temperature (the intake air temperature) at the time when the operation of the engine 11 is stopped and the engine stoppage time length and of determining the existence/nonexistence of the energization to the block heater 34 by comparing the coolant temperature estimate and the coolant temperature sensing value sensed with the coolant temperature sensor 32.

If the operation of the engine 11 is stopped before the warm-up of the engine 11 is completed, the coolant temperature at the time when the operation of the engine 11 is stopped is low, and the difference between the coolant temperature and the ambient temperature is small. Accordingly, the decrease amount of the coolant temperature during the engine stoppage reduces, making it difficult to distinguish the state from the case where the energization to the block heater 34 exists.

Therefore, in the present embodiment, the determination of the existence/nonexistence of the energization to the block heater 34 is prohibited when the coolant temperature at the time when the operation of the engine 11 is stopped is equal to or lower than predetermined temperature (for example, 60 degrees C.). Thus, erroneous determination of the existence/nonexistence of the energization to the block heater 34 can be prevented when the coolant temperature at the time when the operation of the engine 11 is stopped is low and the difference between the coolant temperature and the ambient temperature is small.

The coolant temperature change amount during the engine stoppage or the temperature difference between the coolant temperature and the ambient temperature as of the start changes in accordance with the engine stoppage time length. Therefore, in the case where the existence/nonexistence of the energization to the block heater 34 is determined by using the coolant temperature change amount during the engine stoppage or the temperature difference between the coolant temperature and the ambient temperature (the intake air temperature) as of the start, a determination condition using the engine stoppage time length as a parameter has to be set. In consequence, there is a possibility that the work of adaptation and evaluation of the determination condition is troublesome or determination accuracy is deteriorated due to the variation in the engine stoppage time length.

Therefore, paying attention to the self-start of temporarily turning on the power supply to the ECU 41 for performing the leak diagnosis when a predetermined time (for example, five hours) elapses after the operation of the engine 11 is stopped, the present embodiment determines the existence/nonexistence of the energization to the block heater 34 by using the self-start. The engine stoppage time length from the stop of the operation of the engine 11 to the self-start is invariably the fixed time length (for example, five hours). Therefore, if the existence/nonexistence of the energization to the block heater 34 is determined by using the self-start, the deterioration of the determination accuracy due to the variation in the engine stoppage time length can be avoided. Moreover, the adaptation and the evaluation of the determination condition using the engine stoppage time length as the parameter becomes unnecessary. Accordingly, the work of the adaptation and the evaluation of the determination condition becomes easy.

In the present embodiment, the coolant temperature sensed with the coolant temperature sensor 32 at the time of the self-start is stored in a backup RAM 45 of the ECU 41 (which is a rewritable storage device that holds the stored data even when the power supply to the ECU 41 is turned off). Then, the existence/nonexistence of the energization to the block heater 34 is determined by using the coolant temperature as of the self-start read from the backup RAM 45 of the ECU 41 when the power supply to the ECU 41 is turned on next time (i.e., at the next start). Alternatively, the existence/nonexistence of the energization to the block heater 34 may be determined during the self-start, and the determination result may be stored in the backup RAM 45.

Next, processing contents of the routines shown in FIGS. 7 to 11 executed by the ECU 41 will be explained.

Figure 7:
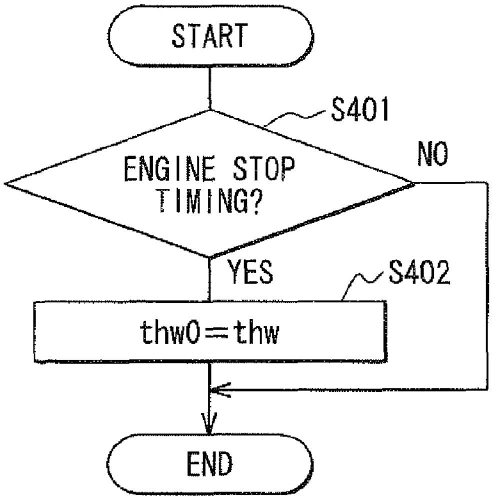
FIG. 7 is a flowchart showing a processing flow of an engine stop timing coolant temperature sensing routine according to the second embodiment.

An engine stop timing coolant temperature sensing routine shown in FIG. 7 is started in a predetermined cycle (for example, 32 msec cycle) while the power supply to the ECU 41 is ON. If the routine is started, first in S401, it is determined whether the present time is the engine stop timing. If the present time is not the engine stop timing, the routine is ended as it is. The engine stop timing is a time point when the operation of the engine 11 is stopped, i.e., a time point when the IG switch 43 is switched from ON to OFF.

After that, when the IG switch 43 is switched from ON to OFF and the operation of the engine 11 is stopped, S401 is determined to be YES and the process proceeds to S402. In S402, the coolant temperature thw sensed with the coolant temperature sensor 32 at the engine stop timing is stored in the backup RAM 45 as engine stop timing coolant temperature "'thw0'", and the routine is ended.

Figure 8:
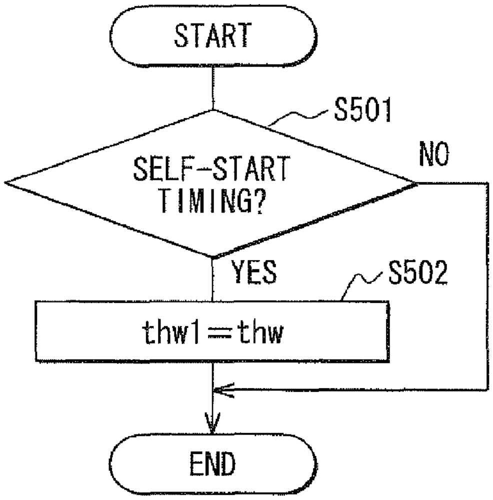
FIG. 8 is a flowchart showing a processing flow of a self-start timing coolant temperature sensing routine according to the second embodiment.

A self-start timing coolant temperature sensing routine shown in FIG. 8 is started in a predetermined cycle (for example, 32 msec cycle) while the power supply to the ECU 41 is ON. If the routine is started, first in S501, it is determined whether the present time is the self-start timing (i.e., timing when five hours elapse after the operation of the engine 11 is stopped). If the present time is not the self-start timing, the routine is ended as it is.

After that, when the self-start is performed, S501 is determined to be Yes and the process proceeds to S502. In S502, the coolant temperature thw sensed with the coolant temperature sensor 32 at the self-start timing is stored in the backup RAM 45 as self-start timing coolant temperature "thw1", and the routine is ended.

Figure 9:
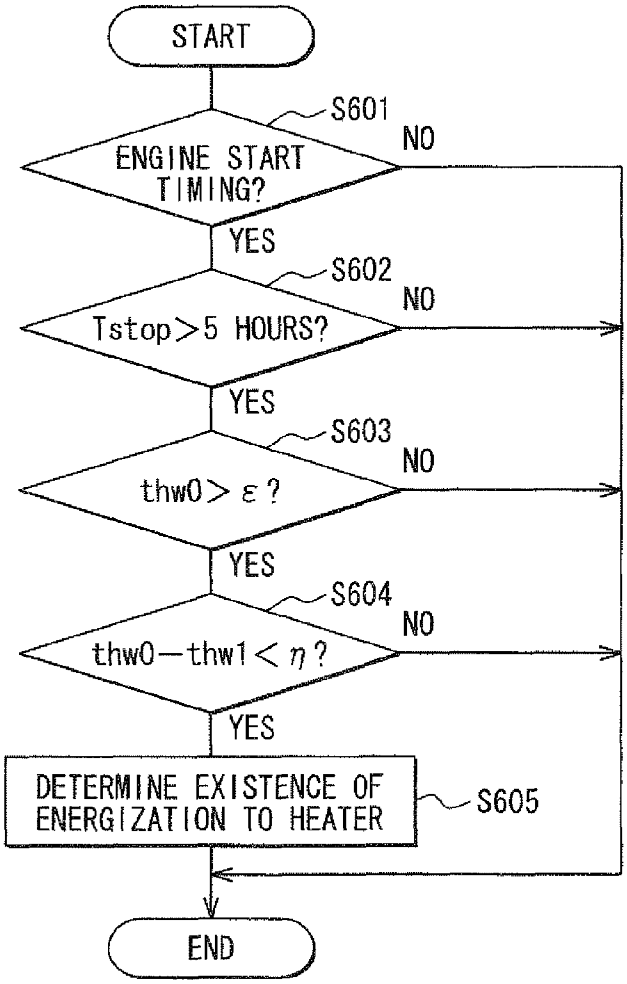
FIG. 9 is a flowchart showing a processing flow of a block heater determination routine according to the second embodiment.

A block heater determination routine shown in FIG. 9 (functioning as a block heater determination device) is started in a predetermined cycle (for example, 32 msec cycle) while the power supply to the ECU 41 is ON. If the routine is started, first in S601 it is determined whether the present time is the engine start timing (i.e., a time point when the IG switch 43 is switched from OFF to ON). If the present time is not the engine start timing, the routine is ended as it is.

If it is determined that the present time is the engine start timing in S601, the process proceeds to S602 to determine whether the self-start has been performed based on whether the engine stoppage time length Tstop is longer than five hours. If it is determined that the engine stoppage time length Tstop is shorter than five hours (i.e., if it is determined that the self-start has not been performed yet), the routine is ended as it is.

If it is determined that the engine stoppage time length Tstop is longer than five hours in S602 (i.e., if it is determined that the self-start has been performed), the process proceeds to S603. In S603, it is determined whether the engine stop timing coolant temperature thw0 read from the backup RAM 45 is higher than a predetermined value $\epsilon$ (for example, 60 degrees C.). If it is determined that the engine stop timing coolant temperature thw0 is equal to or lower than the predetermined value $\epsilon$, it is determined that there is a possibility that the existence/nonexistence of the energization to the block heater 34 is determined erroneously. In this case, the routine is ended as it is without determining the existence/nonexistence of the energization to the block heater 34.

If it is determined that the engine stop timing coolant temperature thw0 is higher than the predetermined value $\epsilon$ in S603, the process proceeds to S604. In S604, it is determined whether the temperature difference (thw0−thw1) between the engine stop timing coolant temperature thw0 and the self-start timing coolant temperature thw1 (i.e., the coolant temperature decrease amount (thw0−thw1) during the engine stoppage from the engine stop timing to the self-start timing) read from the backup RAM 45 is less than a determination value $\eta$. If it is determined that the coolant temperature decrease amount (thw0−thw1) during the engine stoppage is less than the determination value $\eta$, the process proceeds to S605 to determine that the energization to the block heater 34 exists. If it is determined that the coolant temperature decrease amount (thw0−thw1) during the engine stoppage is equal to or greater than the determination value $\eta$, it is determined that the energization to the block heater 34 does not exist and the routine is ended.

As mentioned above, the determination method of the existence/nonexistence of the energization to the block heater 34 may be modified arbitrarily. For example, it may be determined whether temperature difference (thw1−tha) between the self-start timing coolant temperature thw1 and the ambient temperature tha (the intake air temperature) is less than a determination value in S604. It may be determined that the energization to the block heater 34 exists if the temperature difference (thw1−tha) is equal to or greater than the determination value. In this case, as the data of the ambient temperature tha (intake air temperature), the ambient temperature tha (the intake air temperature) sensed with the ambient temperature sensor (or the intake air temperature sensor) on the occasion of the self-start may be stored in the backup RAM 45.

Alternatively, temperature difference (thw1−thw) between the self-start timing coolant temperature thw1 and the coolant temperature thw as of the engine start may be used, or temperature difference (thw0−thw) between the engine stop timing coolant temperature thw0 and the coolant temperature thw as of the engine start may be used.

Figure 10:
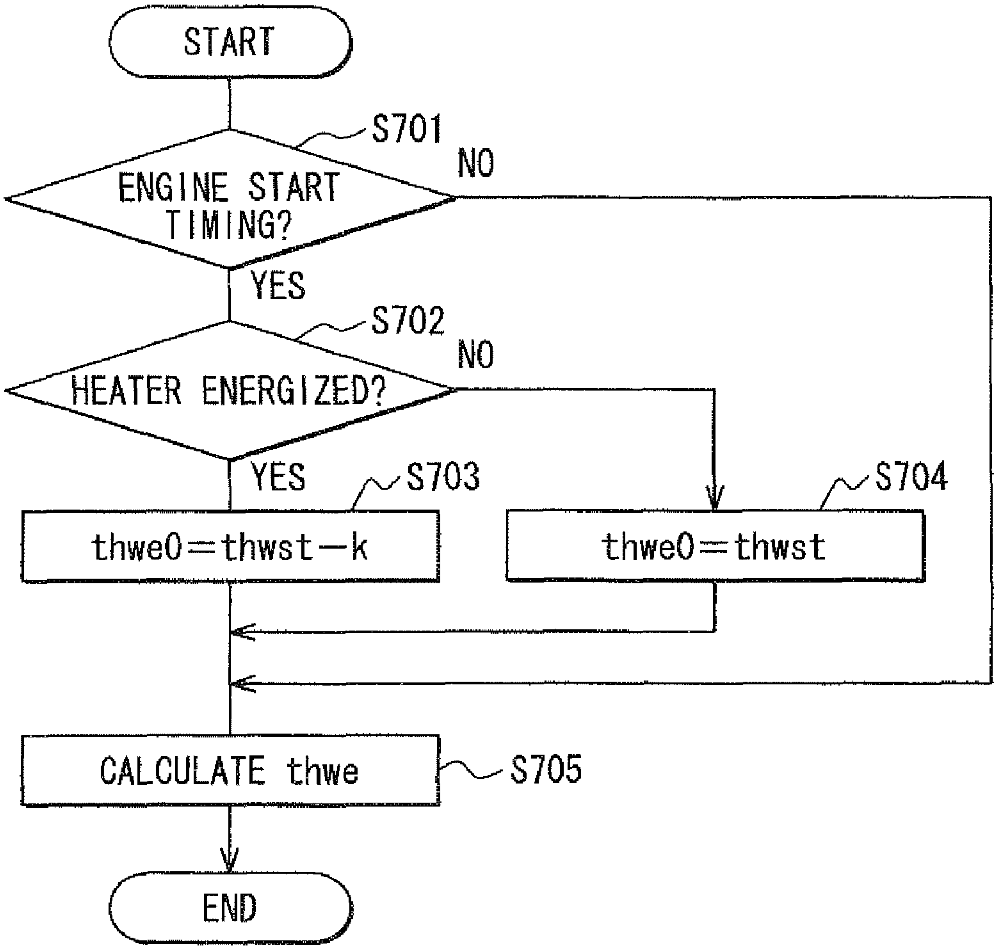
FIG. 10 is a flowchart showing a processing flow of a coolant temperature estimation routine according to the second embodiment.

A coolant temperature estimation routine shown in FIG. 10 is started in a predetermined cycle (for example, 32 msec cycle) while the power supply to the ECU 41 is ON and functions as a coolant temperature estimation device. If the routine is started, first in S701, it is determined whether the present time is the engine start timing (i.e., the time point when the IG switch 43 is switched from OFF to ON). If the present time is the engine start timing, the process goes to S702. In S702, it is determined whether the existence of the energization to the block heater 34 is determined based on the processing result of the block heater determination routine shown in FIG. 9. If it is determined that the energization to the block heater 34 does not exist, the process proceeds to S704. In S704, the coolant temperature "thwst" as of the engine start sensed with the coolant temperature sensor 32 is set as an estimation coolant temperature initial value "thwe0."

$$\text{thwe0}=thwst$$

If it is determined that the energization to the block heater 34 exists, the process proceeds to S703, In S703, a value calculated by subtracting a predetermined coolant temperature correction value k from the coolant temperature thwst as of the engine start is set as the estimation coolant temperature initial value thwe0.

$$thwe0=thwst-k$$

If it is determined that the present time is not the engine start timing in S701, the processing from S702 to S704 is omitted.

Then, the process proceeds to S705 to calculate the estimation coolant temperature thwe by using the estimation coolant temperature initial value thwe0 and a thermal load parameter contributing to the rise of the coolant temperature out of the engine operation parameters. The thermal load parameter may be calculated from an engine load integration value and an integration cooling loss value (a cooling loss value due to a heater for indoor heating or running wind).

Figure 11:
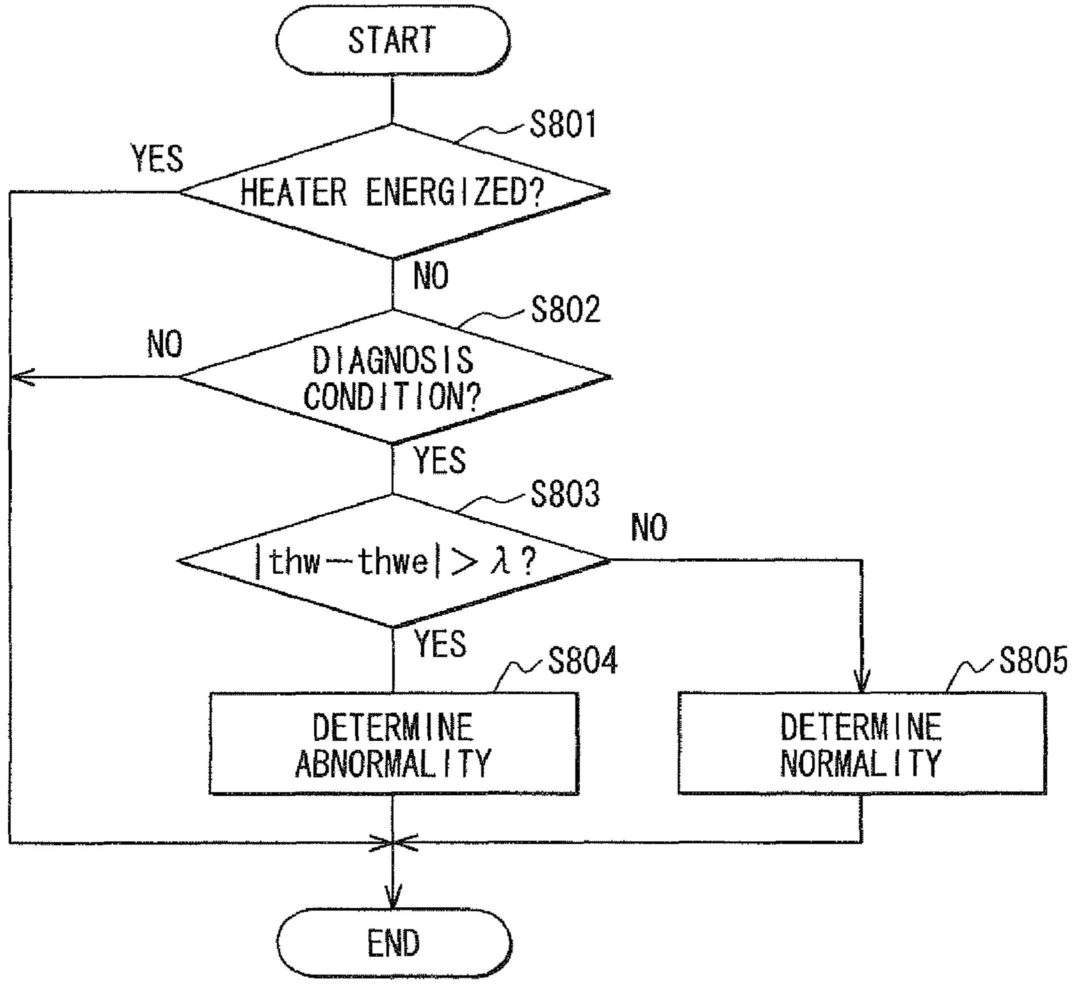
FIG. 11 is a flowchart showing a processing flow of a cooling system abnormality diagnosis routine according to the second embodiment.

A cooling system abnormality diagnosis routine shown in FIG. 11 is started in a predetermined cycle (for example, 32 msec cycle) while the power supply to the ECU 41 is ON. If the routine is started, first, in S801, it is determined whether the existence of the energization to the block heater 34 is determined based on the processing result of the block heater determination routine shown in FIG. 9. If it is determined that the energization to the block heater 34 exists, the routine is ended without performing subsequent abnormality diagnosis processing. The processing of S801 functions as an erroneous diagnosis prevention device.

If it is determined that the energization to the block heater 34 does not exist in S801, the process proceeds to S802. In S802, it is determined whether a cooling system abnormality diagnosis execution condition is established, for example, based on whether engine warm-up operation is in progress or based on whether an abnormality diagnosis result of the intake air temperature sensor (the ambient temperature sensor) or the like is normal. If the cooling system abnormality diagnosis execution condition is not established, the routine is ended as it is.

If it is determined that the cooling system abnormality diagnosis execution condition is established in S802, the process goes to S803. In S803, existence/nonexistence of an abnormality in the cooling system (the thermostat valve 30, the coolant temperature sensor 32, the radiator 29 and the like) is determined based on whether an error between the actual coolant temperature thw sensed with the coolant temperature sensor 32 and the estimation coolant temperature thwe calculated by the coolant temperature estimation routine shown in FIG. 10 (i.e., an absolute value of difference between the actual coolant temperature thw and the estimation coolant temperature thwe) is greater than an abnormality determination value $\lambda$. If it is determined that the error between the actual coolant temperature thw and the estimation coolant temperature thwe is equal to or less than the abnormality determination value $\lambda$ in S803, the process proceeds to S805, in which it is determined that the cooling system is normal and the routine is ended.

If it is determined that the error between the actual coolant temperature thw and the estimation coolant temperature thwe is greater than the abnormality determination value $\lambda$ in S803, the process proceeds to S804. In S804, it is determined that the cooling system is abnormal and warning is provided to a driver by turning on a warning lamp 46 provided in an instrument panel at the driver's seat or by indicating a warning in an alarm display. Also, in S804, abnormality information (an abnormality code) is stored in the backup RAM 45 of the ECU 41, and the routine is ended.

Next, a control example of the above-described present embodiment will be explained with reference to a time chart shown in FIG. 12. At a time point t21 when the IG switch 43 is turned off, the operation of the engine 11 is stopped and the coolant temperature thw sensed with the coolant temperature sensor 32 at the engine stop timing is stored in the backup RAM 45 as the engine stop timing coolant temperature thw0. Then, the main relay 42 is turned off to turn off the power supply to the ECU 41 and the like.

In the case where the block heater 34 is not energized during the engine stoppage, the coolant temperature thw falls in accordance with the temperature difference between the coolant temperature thw0 and the ambient temperature tha (the intake air temperature) as of the engine stop timing t21 and the engine stoppage time length as shown by the broken line b. If the block heater 34 is energized during the engine stoppage, the lowering of the coolant temperature thw is suppressed by the heat generation from the block heater 34 as shown by the solid line a.

After that, at a time point t22 when a predetermined time (for example, five hours) elapses after the engine stop timing t21, the main relay 42 is turned on to turn on the power supply to the ECU 41 as the self-start of the ECU 41. Thus, the ECU 41 performs the leak diagnosis of the evaporative purge system. At the same time, the coolant temperature thw sensed with the coolant temperature sensor 32 at the self-start timing t22 is stored in the backup RAM 45 as the self-start timing coolant temperature thw1. Then, the main relay 42 is turned off to turn off the power supply to the ECU 41 and the like at a time point t23 when the leak diagnosis is ended.

After that, the main relay 42 is turned on to turn on the power supply to the ECU 41 at a time point t24 when the IG switch 43 is turned on. Thus, the engine 11 is started. The existence/nonexistence of the energization to the block heater 34 is determined by comparing the temperature difference (thw0−thw1) between the engine stop timing coolant temperature thw0 and the self-start timing coolant temperature thw1 read from the backup RAM 45, the temperature difference (thw1−tha) between the self-start timing coolant temperature thw1 and the ambient temperature tha (the intake air temperature) or the like with the determination value. The abnormality diagnosis of the cooling system is prohibited when it is determined that the energization to the block heater 34 exists. Instead of prohibiting the abnormality diagnosis of the cooling system, the abnormality diagnosis condition (the abnormality determination value, the coolant temperature and the like) may be corrected.

According to the above-described present embodiment, the abnormality diagnosis of the cooling system is prohibited (or the abnormality diagnosis condition is corrected) when it is determined that the energization to the block heater 34 exists. Accordingly, erroneous diagnosis of the abnormality/normality of the cooling system due to the variation in the behavior of the coolant temperature caused by the existence/nonexistence of the energization to the block heater 34 during the engine stoppage can be prevented. As a result, the diagnosis accuracy and the reliability of the abnormality diagnosis of the cooling system can be improved.

Moreover, according to the present embodiment, the determination of the existence/nonexistence of the energization to the block heater 34 is prohibited when the coolant temperature at the time when the operation of the engine 11 is stopped is equal to or lower than the predetermined temperature. Accordingly, erroneous determination of the existence/nonexistence of the energization to the block heater 34 can be prevented when the coolant temperature at the time when the operation of the engine 11 is stopped is low and the difference between the coolant temperature and the ambient temperature is small.

Moreover, in the present embodiment, the coolant temperature estimate is corrected when it is determined that the energization to the block heater 34 exists. Accordingly, the estimation error of the coolant temperature due to the energization to the block heater 34 can be corrected, improving estimation accuracy of the coolant temperature.

According to the present embodiment, the existence/nonexistence of the energization to the block heater 34 is determined by using the self-start for the leak diagnosis or the like. The present invention can be applied to and implemented as a system that does not perform the self-start.

The present invention is not limited to above-described embodiment. For example, the present invention may be implemented by arbitrarily modifying the determination method of the existence/nonexistence of the energization to the block heater 34, the method of the abnormality diagnosis of the cooling system or the estimation method of the coolant temperature.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A controller of an internal combustion engine having a function to energize a block heater, which is mounted to the engine, with an external power supply to keep an engine coolant warm during an engine stoppage in cold climate, the controller comprising:

a coolant temperature sensing means for sensing coolant temperature of the engine;

a rotation speed sensing means for sensing rotation speed of the engine; and a block heater determination means for determining existence or nonexistence of energization to the block heater during the engine stoppage based on a behavior of the coolant temperature or a behavior of the engine rotation speed immediately after a start of the engine, wherein the block heater determination means determines that the block heater has been energized during the engine stoppage if the coolant temperature falls immediately after the start of the engine.

2. The controller as in claim 1, wherein the block heater determination means determines the behavior of the coolant temperature or the behavior of the engine rotation speed immediately after the start based on at least one of a change amount, change speed, a change direction and an integration value of a sensing value of the coolant temperature or the engine rotation speed.

3. The controller as in claim 1, further comprising:

an abnormality diagnosis means for performing abnormality diagnosis of a cooling system based on a behavior of the coolant temperature during an operation of the engine; and an erroneous diagnosis prevention means for prohibiting the abnormality diagnosis of the cooling system or correcting a condition for the abnormality diagnosis when the block heater determination means determines that the energization to the block heater exists.

4. The controller as in claim 1, further comprising:

a coolant temperature estimation means for estimating the coolant temperature of the engine based on an operation state of the engine, wherein the coolant temperature estimation means has a means for correcting the coolant temperature estimate or control using the coolant temperature estimate when the block heater determination means determines that the energization to the block heater exists.

5. A cooling system abnormality diagnosis device of an internal combustion engine that energizes a block heater which is mounted to the engine, with an external power supply to keep an engine coolant warm during an engine stoppage in cold climate and that performs abnormality diagnosis of a cooling system based on a behavior of coolant temperature during an operation of the engine, the cooling system abnormality diagnosis device comprising:

a block heater determination means for determining existence or nonexistence of energization to the block heater during the engine stoppage, wherein the block heater determination means determines that the block heater has been energized during the engine stoppage if the coolant temperature falls immediately after the start of the engine; and an erroneous diagnosis prevention means for prohibiting the abnormality diagnosis of the cooling system or correcting a condition for the abnormality diagnosis when the block heater determination means determines that the energization to the block heater exists.

6. The cooling system abnormality diagnosis device as in claim 5) wherein the block heater determination means has a means for prohibiting the determination of the existence or nonexistence of the energization to the block heater when the coolant temperature at the time when the operation of the engine is stopped is equal to or lower than predetermined temperature.

7. The cooling system abnormality diagnosis device as in claim 5, further comprising:

a coolant temperature estimation means for estimating the coolant temperature of the engine based on an operation state of the engine, wherein the coolant temperature estimation means has a means for correcting the coolant temperature estimate when the block heater determination means determines that the energization to the block heater exists.

8. A block heater determination device of an internal combustion engine that energizes a block heater, which is mounted to the engine, with an external power supply to keep an engine coolant warm during an engine stoppage in cold climate, the block heater determination device comprising:

a block heater determination means for determining existence or nonexistence of energization to the block heater during the engine stoppage based on at least coolant temperature and time length of the engine stoppage; and a self-start means for performing self-start of the block heater determination means by temporarily turning on power supply to the block heater determination means when a predetermined time passes after an operation of the engine is stopped, wherein the block heater determination means determines the existence or nonexistence of the energization to the block heater by using the self-start.

9. A controller of an internal combustion engine, with an external power supply to keep an engine coolant warm during an engine stoppage in cold climate, the controller comprising:

a coolant temperature sensing means for sensing coolant temperature of the engine;

a rotation speed sensing means for sensing rotation speed of the engine;

a block heater determination means for determining existence or nonexistence of energization to the block heater during the engine stoppage based on a behavior of the coolant temperature or a behavior of the engine rotation speed immediately after a start of the engine;

an abnormality diagnosis means for performing abnormality diagnosis of a cooling system based on a behavior of the coolant temperature during an operation of the engine; and an erroneous diagnosis prevention means for prohibiting the abnormality diagnosis when the block heater determination means determines that the energization to the block heater exists.

10. A cooling system abnormality diagnosis device of an internal combustion engine that energizes a block heater which is mounted to the engine, with an external power supply to keep an engine coolant warm during an engine stoppage in cold climate and that performs abnormality diagnosis of a cooling system based on a behavior of coolant temperature during an operation of the engine, the cooling system abnormality diagnosis device comprising:

a block heater determination means for determining existence or nonexistence of energization to the block heater during the engine stoppage; and an erroneous diagnosis prevention means for prohibiting the abnormality diagnosis of the cooling system or correcting a condition for the abnormality diagnosis when the block heater determination means determines that the energization to the block heater exists, wherein the block heater determination means has a means for prohibiting the determination of the existence or nonexistence of the energization to the block heater when the coolant temperature at the time when the operation of the engine is stopped is equal to or lower than predetermined temperature.

* * * * *